3,121,678
PRODUCTION OF SPECIALTY OIL
Oral C. Behymer and William K. Robbins, Baytown, Tex., and James E. Kehoe, Clark, N.J., assignors, by mesne assignments, to Esso Research and Engineering Company, Elizabeth, N.J., a corporation of Delaware
Filed Feb. 9, 1960, Ser. No. 7,657
7 Claims. (Cl. 208—212)

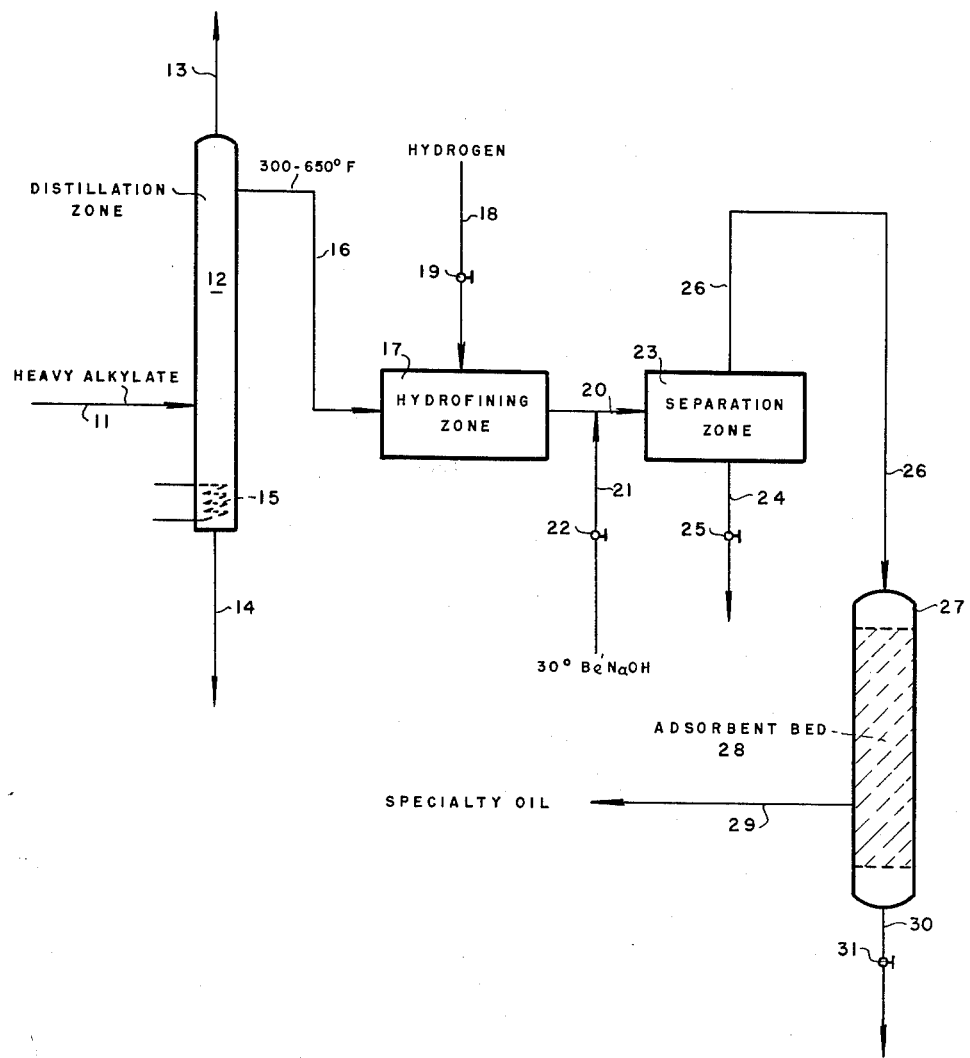

The present invention is directed to a method for producing specialty oils. More particularly, the invention is concerned with the production of specialty oils from heavy alkylate. In its more specific aspects, the invention is concerned with a method for producing a composition having improved qualities and usefulness as a specialty oil.

The present invention may be briefly described as a method for producing specialty oils in which a heavy alkylate fraction boiling within the range of about 300° to about 650° F. is subjected to hydrofining conditions in the presence of sulfur insensitive catalysts. The hydrofined fraction is admixed with a solution of alkali metal hydroxide having a Baumé gravity from about 15° to about 50°. The hydrofined fraction is separated from the solution and then contacted with an adsorbent selected from the group consisting of activated magesium oxide, activated charcoal, mixtures of activated magnesium oxide with activated charcoal, and bauxite to obtain an odorless and colorless product containing less than 10 p.p.m. of sulfur and consisting essentially of 90 percent to 99 percent saturated hydrocarbons with the remainder being olefinic and aromatic hydrocarbons.

While the adsorbent employed in the practice of the present invention may be any one of the several adsorbents employed, it is preferred to employ activated charcoal. However, activated magnesium oxide gives satisfactory results and satisfactory results are also obtained with mixtures of activated charcoal and activated magnesium oxide. Products of satisfactory odor may be produced with bauxite. It is also intended that, besides employing bauxite, it may be possible to use the activated aluminas which are also active adsorbents.

The admixing of the hydrofined products with the alkali metal hydroxide solution and contacting with the adsorbent may suitably be conducted at ambient temperatures. Ambient temperatures within the range of about 60° to about 100° F. are satisfactory, but, preferably, temperatures within the range of 80° to 100° F. are used. Obviously, therefore, the hydrofined products are in the liquid phase when contacted with the alkali metal hydroxide and with the adsorbent.

The alkali metal hydroxide solution is preferably sodium hydroxide although solutions of potassium hydroxide and lithium hydroxide may also be used.

It is preferred to employ the alkali metal hydroxide solution on a once-through basis. That is, best results are obtained when the hydrofined alkylate is contacted with fresh alkali metal hydroxide solution. It is to be understood, however, that, under some circumstances, it may be desirable to recirculate the alkali metal hydroxide solution. Contacting of the hydrofined alkylate with fresh solution of alkali metal hydroxide is important since this eliminates any possibility of the alkylate absorbing or desolving odor forming or odoriferous compounds from the alkali metal hydroxide solution.

While it is preferred to contact the caustic treated fraction with the adsorbent arranged as a bed, it is to be understood that the contacting may be accomplished by forming a slurry of the adsorbent in the caustic treated fraction. However, employing a bed of the adsorbent simplifies the separation problem and ordinarily will be preferred.

The feed stock charged in the present invention is a heavy alkylate fraction which boils within the range of about 300° to about 650° F. The heavy alkylate is produced by the alkylation of olefins and isoparaffins. Particularly, the $C_2$ to $C_5$ olefin hydrocarbons may be employed as a feed stock while the isoparaffins will include the $C_4$ to $C_5$ isoparaffins. Preferably, the reactants comprise isobutane and the $C_4$ olefins. The alkylation operation is conventional and the ratio of isoparaffin to olefin is maintained relatively high in order to form alkylate selectively. The concentration of the sulfuric acid employed as a catalyst is in excess of about 88 percent and preferably in excess of 96 percent $H_2SO_4$. Temperature conditions are in the range of about 30° to about 100° F. while the reaction time is generally from about 10 to about 60 minutes. It is understood, in the alkylation operation that recycle of acid and emulsion of acid and hydrocarbons may be practiced for best results.

The present invention is further illustrated by reference to the drawing in which the single figure is a flow diagram of a preferred mode.

Referring now to the drawing, numeral 11 designates a charge line through which a heavy alkylate obtained from the catalytic alkylation of isobutane and butylenes with sulfuric acid is introduced into the system and is charged thereby to a distillation zone 12 which suitably is a fractionation tower equipped with suitable vapor-liquid contacting means and provided with means for inducing reflux and condensing-cooling means and other equipment associated with the modern distillation method. Distillation zone 12 is provided with line 13 for removal of fractions boiling below about 300° F. and with line 14 for discharge of fractions boiling above about 650° F. Distillation zone 12 is also provided with a heating means illustrated by steam coil 15. Zone 12 has a line 16 by way of which a fraction boiling within the range of 300° to 650° F. is obtained for charging to hydrofining zone 17. In hydrofining zone 17 temperatures within the range of about 550° to about 650° F. are employed, pressures within the range of 150 to 500 pounds per square inch and the fraction in line 16 is charged at a space velocity from about 2 to about 10 v./v./hr. Hydrogen is introduced into zone 17 through line 18 controlled by valve 19 to provide an amount of hydrogen within the range of about 100 to about 1000 standard cubic feet per barrel of the 300° to 650° fraction charged to zone 17.

In hydrofining zone 17 a sulfur-insensitive catalyst is employed. There are many sulfur-insensitive catalysts which may be used in the practice of the present invention. Typical of the sulfur-insensitive catalyst are cobalt molybdate, molybdenum sulfide, molybdenum oxide, and the like. Ordinarily cobalt molybdate on a suitable support such as alumina is to be preferred with about 5% to 10% by weight of cobalt molybdate on the support, although greater or lesser amounts may be used. Under the conditions prevailing in zone 17, the odoriferous compounds present in the alkylate introduced by line 16 are substantially reduced. These odoriferous compounds may include hydrogen sulfide, mercaptans, disulfides, nitrogenous compounds, phenolic compounds and other odoriferous compounds which are originally in the fraction introduced by line 16. The hydrofining operation does not remove all of the odoriferous compounds and to achieve a specialty oil of the required characteristics, it is necessary and important that the hydrofined product be subjected to further treatment in accordance with the present invention. Therefore, the hydrofined product is discharged from zone 17 by line 20 and has admixed therewith a suitable caustic solution such as a 30 Bé. sodium hydroxide solution introduced by line 21 controlled by valve 22. A mixing means may be provided in line 20 which may be any conventional mixing means, as desired, and the admixture of hydrofined fraction and caustic solution is then discharged into a separation zone 23 which may be any type of separation zone but which, for convenience, is shown as a settling zone of sufficient size and capacity to provide a residence time which allows separation between the hydrofined product and the caustic solution, the separated caustic solution being discharged by line 24, controlled by valve 25, and may, if desired, be recycled to line 21 where the separated hydrofined fraction is withdrawn by line 26 and introduced thereby into an adsorption zone 27 provided with a bed 28 of an adsorbent which is preferably activated charcoal. There is withdrawn from the bed 28 by line 29 a specialty oil, which has a sulfur content of less than .10 p.p.m. and which consists essentially of 90 percent to 99 percent saturated hydrocarbons with the remainder being aromatic and olefin hydrocarbons, which is odorless and substantially colorless. Any polymer which is formed in zone 27 is removed from the bottom thereof through line 30 controlled by valve 31 for use as may be desired.

The products produced in accordance with the present invention are unusual in that they have unusual characteristics and are only produced by employing the process in sequence of hydrofining, caustic washing and adsorbent percolation of filtration.

In practicing the present invention, it will be understood that the hydrofining zone 17 may include facilities for steam stripping the hydrofined product for removal or hydrogen sulfide and any light ends that may be formed in the hydrofining operation.

The products produced in accordance with the present invention are many and diverse. For example, heavy alkylate boiling from about 300° to about 650° F. is employed as feed stock in the present invention. This fraction is suitably produced by distillation of alkylate resulting from the alkylation of isoparaffin and olefin in the presence of sulfuric acid catalysts of 90 percent to 100 percent $H_2SO_4$ with the isoparaffin being in excess of the olefin. For example, heavy fractions in the boiling range mentioned supra produced by alkylation of isobutane and butylenes in the presence of strong sulfuric acid as the catalyst are excellent feed stocks in the present invention.

Typical of the products or compositions which are obtainable in the practice of the present invention are the fractions obtainable from heavy alkylate as presented in the following table:

| Boiling Range, °F. | Composition |
| --- | --- |
| 300–350 | Odorless mineral spirit. |
| 345–385 | Dry cleaning solvent. |
| 350–400 | Odorless mineral spirit. |
| 385–400 | Do. |
| 350–410 | Flotation oil. |
| 350–450 | White oil. |
| 400–500 | Torque fluid, aluminum roll oil, insecticide diluent. |
| 430–470 | Flash dry ink oil. |
| 450–650 | Polyolefin diluent carrier, cotton spray oil. |
| 550–650 | Hydraulic oil blend stock, automatic transmission fluid. |
| 500–600 | Turbo fuel, aluminum roll oil, orchard spray oil. |
| 410–620 | Aluminum roll oil. |

These compositions are all characterized by being substantially odorless, colorless, free from compounds which cause irritation to the eyes and skin, and consist essentially of 90 percent to 99 percent by volume of saturated hydrocarbons with only minor amounts of aromatics and olefins making up the remainder.

Particularly, the aluminum roll oil which is produced in accordance with the present invention has unusual characteristics in that it is odorless and is particularly suitable for processing sheets of aluminum. The extremely low sulfur content minimizes staining metals such as aluminum and the low aromatic content serves to decrease the skin and eye irritation problem. The excellent color permits easy product inspection and the products allow the removal of metal fines such as aluminum metal fines because of its ready and improved filterability. Aluminum foil staining problems are eliminated since the roll oil allows laminated foil to be separated readily. The aluminum roll oil is of low pour point which permits all-weather outside storage with no separation of impurities therefrom. Additionally, the aluminum roll oil of the present invention does not cause the formation of static when in use, which has been a problem heretofore.

The present invention will be further illustrated by the following runs.

Operations were conducted in which a fraction boiling in the range from about 400° to about 500° F., obtained by distillation of alklate produced by sulfuric acid alkylation of isoparaffin and olefins, was subjected to hydrofining conditions in accordance with the present invention and was then washed with a sodium hydroxide solution followed by percolation through a bed of activated charcoal. A product was obtained which is suitable as a torque fluid and aluminum roll oil. Inspections of the products produced in two of these runs will be found in Table I.

*Table I*

| | Torque Fluid, Aluminum Roll Oil | |
| --- | --- | --- |
| Gravity, °API | 48.2 | 49.8 |
| IBP, °F | 434 | 404 |
| FBP, °F | 508 | 492 |
| 5% Distilled at, °F | 440 | |
| 10% Distilled at, °F | 442 | 405 |
| 20% Distilled at, °F | 444 | |
| 30% Distilled at, °F | 446 | |
| 40% Distilled at, °F | 450 | |
| 50% Distilled at, °F | 452 | 430 |
| 60% Distilled at, °F | 456 | |
| 70% Distilled at, °F | 460 | |
| 80% Distilled at, °F | 467 | |
| 90% Distilled at, °F | 479 | 468 |
| 95% Distilled at, °F | 494 | |
| Saybolt Color | +30 | +30 |
| Corrosion, 3 Hrs. at 212° F | 1a | 1b |
| Flash, P.M., °F | 188 | 182 |
| Viscosity at 100° F | 35.3 Sec. | 33.8 Sec. |
| Viscosity at 210° F., cs | 1.098 | |
| Pour, °F | <−70 | <−75 |
| Sulfur, p.p.m | 3 | 9 |
| Iodine No | 4.6 | 5.5 |
| Smoke Point | 38 | 37 |
| Aniline Point | 193 | 191 |
| Phenol No | 0 | |
| Kauributanol | 25.9 | 27.5 |
| Refractive Index, N 20/D | 1.43751 | |
| Bromine No | 1.33 | 1.08 |

The product whose inspection characteristics are shown in Table I passes an aluminum stain test and has been employed in an operation where aluminum foil was being processed. The aluminum roll oil, as shown in Table I, was found to be superior to conventionally produced kerosene type roll oils in that eye and skin irritation to personnel was eliminated.

Additional operations were conducted wherein a fraction boiling in the range from about 350° to about 385° F. and obtained from the alkylate from the sulfuric acid alkylation of isoparaffins and olefins was subjected to hydrofining conditions in accordance with the present invention followed by caustic washing and percolation through activated charcoal. The products were recovered and the inspection characteristics thereof are given in Table II.

Table II

|  | Dry Cleaning Solvent | |
| --- | --- | --- |
| Gravity, ° API | 55.0 | 54.9 |
| IBP, ° F | 350 | 345 |
| FBP, ° F | 377 | 384 |
| 5% Distilled at, ° F | 352 | 348 |
| 10% Distilled at, ° F | 353 | 350 |
| 20% Distilled at, ° F | 354 | 351 |
| 30% Distilled at, ° F | 355 | 353 |
| 40% Distilled at, ° F | 356 | 354 |
| 50+ Distilled at, ° F | 357 | 355 |
| 60% Distilled at, ° F | 359 | 357 |
| 70% Distilled at, ° F | 360 | 358 |
| 80% Distilled at, ° F | 361 | 360 |
| 90% Distilled at, ° F | 363 | 364 |
| 95% Distilled at, ° F | 367 | 368 |
| Dry Point, ° F | 371 | 374 |
| Tag Flash, ° F | 126 | 120 |
| Color Saybolt | +30 | +30 |
| Varsol Corrosion | 2a | 2a |
| Sulfur, p.p.m. | 3 | 5 |
| Aniline Point, ° F | 183 | 182 |
| Bromine Number | 0.3 | 0.4 |
| Aromatics, Percent | 1.0 | 2.0 |
| Kauri-Butanol Number | 26.9 | 27.6 |
| Refractive Index | 1.42278 |  |
| Specific Gravity | 0.7567 |  |
| Viscosity at 100° F., cs |  | 1.385 |
| Analysis: |  |  |
| Aromatics | 0.0 |  |
| Olefins | 0.5 |  |
| Paraffins | 93.4 |  |
| Naphthenes | 6.1 |  |
| Odor, bulk | Good | Good |

These products were found to be excellent dry cleaning solvents, were odorless and colorless and were found to create less eye and skin irritation to personnel than conventionally produced compositions. Further, the dry cleaning solvent, as shown in Table II, requires less detergent, cleans clothes thoroughly and brings out the brightness of color and sheen, reduces the amount of clothes which require sizing, reduces generation of static electricity, and reduces wrinkling during tumbling with subsequent reduction in pressing effort. Moreover, the dry cleaning solvent is not subject to degradation by bacteria which causes the formation of odor.

Runs were also conducted on a 400° to 620° F. fraction from the alkylate produced from sulfuric acid alkylation of isoparaffins and olefins which was treated in accordance with the present invention. This product is suitable as aluminum roll oil. Fractions from sulfuric acid catalyzed alkylate of isoparaffins and olefins have been produced which boil in the range from 430° to 470° F. which, after treatment in accordance with the present invention, are suitable for flash-dry ink oil. Fractions which boil in the range from 350° to 380° F. produced as described and claimed here are suitable as cosmetic oil, the fractions being odorless and colorless and of substantially reduced sulfur content. Other products may be produced which are odorless and colorless and which boil in the range from about 450° to about 650° F. and have a viscosity at 100° F. of 48 and 52 seconds. These products are suitable as cotton spray oils and white oil base stocks.

In practicing the present invention wherein products from alkylate are obtained by hydrofining, caustic washing, and adsorbent contacting, the products boiling in the range from about 345° to about 385° F. have a composition of 93 percent by volume of paraffins 6 percent by volume of napthenes, and 1 percent by volume of olefins. Fractions boiling in the range between 400° and 500° F. produced in accordance with the present invention have a composition of 88 percent by volume of paraffins, 8 percent by volume of napthenes, with the remainder being divided equally between the aromatics and olefins. Fractions boiling in the range from about 500° to about 650° F. consist of about 66% paraffins, 25% naphthenes, 6% olefins, and 3% aromatics. In a word, in accordance with the present invention, the compositions contain from about 90 percent to about 99 percent of saturated hydrocarbons, including paraffins and napthenes, with the remainder being aromatics and olefins. The lower boiling fractions are also suitable as dry cleaning solvents, odorless mineral spirits, and charcoal lighter fluids while the intermediate boiling fractions are suitable for use as aluminum roll oil and insecticide bases. The higher boiling fractions may be used as aluminum roll oils and other spray oils. Many uses for the compositions of the present invention are available as set out in the specification supra.

In order to illustrate the invention further, a heavy alkylate fraction of the desired volatility characteristics was hydrofined, caustic washed and charcoal filtered to produce a dry cleaning solvent. The particular characteristics of the solvent result from employing the heavy alkylate fraction as the feed stock and to the processing sequence of the present invention.

In a dry cleaning plant, conventional Varsol No. 3 was employed. Odor degradation of the solvent was so severe that the plant required five complete steam purges within a two-year period in an attempt to eliminate the odor problem without avail. Conventional Varsol No. 3 solvent charges resulted in marked odor deterioration within two to three weeks. A charge of dry cleaning solvent produced in accordance with the present invention showed no signs of odor degradation after seven weeks service.

In practicing the present invention, maximum color improvement is obtained at hydrofining temperatures between 550° and 580° F. with accompanying odor improvement. Above hydrofining temperatures of 650° F. a slight decline in odor may be suffered and maximum reduction in bromine and iodine numbers is effected at temperatures of 650° F. and 1.0 v./v./hr. The higher hydrofining temperatures in the range given result in greatest odor improvement. At temperatures below 550° F. little conversion of olefins is effected.

It is important in the present invention that the sulfur content of the hydrofined, caustic washed and adsorbent filtered product be less than 10 p.p.m. Above 10 p.p.m. the odor of the product suffers and the product becomes objectionable. Thus, to produce specialty oils of improved odor characteristics and of the desirable low sulfur content, it is necessary to maintain the sulfur content of the finished product at less than 10 p.p.m. This sulfur level is only achieved by the combining of hydrofining, caustic washing and adsorbent percolation or filtration. Hydrofining does not remove all of the odoriferous compounds of the type mentioned supra and caustic washing does not remove the final amounts of the odoriferous compounds which are removed only in the final step of adsorbent contact. Thus, it is essential in the practice of the present invention that the three steps be used in order to effectively produce specialty oils.

The nature and objects of the present invention having been completely described and illustrated, what we wish to claim as new and useful and secure by Letters Patent is:

1. A method for producing specialty oils which comprises distilling a heavy alkylate stream in a fractionating column to obtain a heavy alkylate fraction boiling in the range from about 300° to about 650° F., subjecting said heavy alkylate fraction to hydrofining conditions comprising a temperature within the range from about 550° to about 650° F., a pressure within the range from about 150 to about 500 p.s.i.g., a space velocity within the range from about 2 to about 10 v./v./hr., and hydrogen in an amount within the range from about 100 to about 1000 s.c.f./bbl. of said heavy alkylate fraction, in the presence of a sulfur insensitive catalyst, admixing the hydrofined fraction in the liquid phase and at a temperature within the range from about 60° F. to about 100° F. with a solution of alkali metal hydroxide having a Baumé gravity from about 15° to about 50°, separating the hydrofined fraction from the solution, and then contacting the separated fraction in the liquid phase with an adsorbent in a stationary bed, said adsorbent being selected from the group consisting of activated magnesium oxide, activated charcoal, mixtures of activated magnesium oxide and activated charcoal, and bauxite to obtain an odorless and colorless product containing less than 10 p.p.m. of sulfur and consisting essentially of 90 percent to 99 percent saturated hydrocarbons with the remainder being olefinic and aromatic hydrocarbons.

2. A method in accordance with claim 1 in which the adsorbent is a bed of activated charcoal.

3. A method in accordance with claim 1 in which the heavy alkylate fraction boils in the range from about 450° to about 650° F.

4. A method of producing an aluminum roll oil which comprises fractionating a heavy alkylate stream to produce a heavy alkylate fraction boiling within the range of 410° F. to 620° F., hydrofining said heavy alkylate fraction in the presence of a sulfur-insensitive catalyst, at a temperature within the range of 550° F. to 650° F., a pressure of between 150 and 500 p.s.i., a space velocity of between 2 and 10 volumes of oil per volume of catalyst per hour, and at a hydrogen treat rate between 100 and 1000 standard cu. ft./bbl. of alkylate charge, caustic washing the hydrofined alkylate portion by admixing said hydrofined fraction in the liquid phase and at a temperature within the range from about 60° F. to about 100° F. with a solution of alkali metal hydroxide having a Baumé gravity from about 15° to about 50°, separating the hydrofined fraction from the solution, and contacting the separated fraction in the liquid phase with an adsorbent in a stationary bed, said adsorbent being selected from the group consisting of activated magnesium oxide, activated charcoal, mixtures of activated magnesium oxide and activated charcoal, and bauxite, to obtain an odorless and colorless product containing less than 10 p.p.m. of sulfur and consisting essentially of 90% to 99% saturated hydrocarbons, with the remainder being olefinic and aromatic hydrocarbons.

5. A method in accordance with claim 4 wherein the adsorbent is activated charcoal.

6. A process in accordance with claim 5 wherein said alkali metal hydroxide is sodium hydroxide.

7. A method of preparing a dry cleaning solvent which comprises fractionating heavy alkylate hydrocarbons to produce a fraction boiling within the range of 345° F. to 385° F., hydrofining said fraction in the presence of a sulfur-insensitive catalyst, at a temperature between 550° F. and 650° F., at a pressure between 150 p.s.i. and 500 p.s.i., at a space velocity between 2 and 10 volumes of alkylate per volume of catalyst per hour, and at a hydrogen treat rate of 100 to 1000 standard cu. ft./bbl. of alkylate charge, admixing the hydrofined fraction in the liquid phase and at a temperature within the range from about 60° F. to about 100° F. with a solution of sodium hydroxide having a Baumé gravity from about 15° to about 50°, separating the hydrofined fraction from the solution, and then contacting the separated fraction in the liquid phase with a stationary bed of activated charcoal to produce an odorless and colorless product containing less than 10 p.p.m. of sulfur and consisting essentially of 90% to 99% saturated hydrocarbon, with the remainder being olefinic and aromatic hydrocarbons.

References Cited in the file of this patent

UNITED STATES PATENTS

| | | |
|---|---|---|
| 2,762,853 | Jones et al. | Sept. 11, 1956 |
| 2,925,375 | Fleck et al. | Feb. 16, 1960 |
| 2,944,012 | Thompson | July 5, 1960 |

OTHER REFERENCES

Kalichevsky et al.: Chemical Refining of Petroleum, 1942, chapters IV, I and VI. Specifically pages 152, 154, 155, 159, 160, 236–8, 244, 253 and 265–8. Reinhold publishing Corp. N.Y.C., N.Y.